United States Patent
Shah

(10) Patent No.: US 9,176,766 B2
(45) Date of Patent: Nov. 3, 2015

(54) CONFIGURABLE PLANNED VIRTUAL MACHINES

(75) Inventor: Nihar N. Shah, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 602 days.

(21) Appl. No.: 13/177,209

(22) Filed: Jul. 6, 2011

(65) Prior Publication Data

US 2013/0014102 A1 Jan. 10, 2013

(51) Int. Cl.
*G06F 9/455* (2006.01)

(52) U.S. Cl.
CPC .... *G06F 9/45558* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| 7,032,216 | B1 | 4/2006 | Nizhegorodov | |
|---|---|---|---|---|
| 7,831,820 | B2 | 11/2010 | Winner | |
| 8,020,204 | B2* | 9/2011 | Berger et al. | 726/16 |
| 2007/0266383 | A1 | 11/2007 | White | |
| 2008/0201455 | A1 | 8/2008 | Husain | |
| 2008/0222633 | A1 | 9/2008 | Kami | |
| 2008/0263258 | A1* | 10/2008 | Allwell et al. | 711/6 |
| 2009/0064136 | A1 | 3/2009 | Dow | |
| 2010/0153946 | A1 | 6/2010 | Bhaskar | |
| 2010/0299666 | A1* | 11/2010 | Agbaria et al. | 718/1 |
| 2011/0022694 | A1 | 1/2011 | Dalal | |
| 2011/0154331 | A1* | 6/2011 | Ciano et al. | 718/1 |
| 2011/0202640 | A1* | 8/2011 | Pillutla | 709/221 |
| 2012/0266164 | A1* | 10/2012 | Anderson et al. | 718/1 |

OTHER PUBLICATIONS

An Overview of Hyper-V Live Migration—dated 2009, Retrieved Date: Mar. 29, 2011 http://www.virtuatopia.com/index.php/An_Overview_of_Hyper-V_Live_Migration.
Open Virtualization Format Specification; dated Feb. 22, 2009 http://www.dmtf.org/sites/default/files/standards/documents/DSP0243_1.0.0.pdf.

\* cited by examiner

*Primary Examiner* — Gregory A Kessler
(74) *Attorney, Agent, or Firm* — John Jardine; Kate Drakos; Micky Minhas

(57) ABSTRACT

A planned virtual machine, for use in staging the construction of a virtual machine. Such a planned virtual machine may be used as part of a method for migrating virtual machines. The method may include creating a planned virtual machine based on a first realized virtual machine or a template, performing a configuration operation on the planned virtual machine, and converting the planned virtual machine to a second realized virtual machine. The configuration operation may comprise interaction with a virtualization platform managing the planned virtual machine and may be based on input provided by a user.

20 Claims, 8 Drawing Sheets

CONFIGURABLE PLANNED VIRTUAL MACHINES

BACKGROUND

Virtualization technology enables creating software implementations of physical devices such as hardware platforms, storage devices, and network resources. For example, certain types of virtual machines are software implementations of hardware platforms (e.g., physical computing devices) and can execute computer programs like the hardware platforms they emulate. Such virtual machines can contain an operating system and can run software applications written for the operating system.

A virtual machine can execute on a physical device, called a "host," which is different from the physical device that the virtual machine emulates. Virtual machine technology also allows for multiple virtual machines to share resources of the same host. Multiple virtual machines are managed on the same host by a software layer, sometimes called a "virtualization platform," whose function includes controlling how virtual machines share resources of the host.

A benefit of using virtualization technology is that, with few restrictions, any host may be used to implement any virtual machine. A virtual machine may be migrated from a source host to a target host to reduce load on the source host, to allow the source host to be shut down for maintenance or for other reasons that might arise during administration of a computing system. Migrating a virtual machine may comprise making available on the source host data defining the virtual machine, which may be moved or copied from the source host. Though, that data might be obtained at the target host in other ways, such as by importing it from a back up store, which is useful in disaster and error recovery. A virtual machine may be migrated offline, when it is not executing on a host, or online while it is executing on host. Online migration of virtual machines is sometimes referred to as "live" migration.

Conventional approaches to virtual machine migration rely on templates to represent virtual machines. The Open Virtualization Format (OVF) is a standard for virtual machine templates published by the Distributed Management Task Force. Templates conforming to the OVF standard can be used to capture configuration data and other metadata associated with a virtual machine on a source host and help deploy the virtual machine onto a target host.

SUMMARY

A realized virtual machine may be created on a target host by using a planned virtual machine to stage a new realized virtual machine on the target host, such as may occur during migration of a virtual machine from a source host to the target host. A planned virtual machine may be represented by a structure that allows a user and/or a virtualization platform to interact with the planned virtual machine before it is recognized by a virtualization platform as a realized virtual machine capable of providing computing services. A user may interact with the planned virtual machine to provide input during any stage of migrating a virtual machine. Input from the user may be used to control factors such as the timing of the migration process and/or to resolve any errors that may arise during the migration process.

Accordingly, in some embodiments, a method for migrating a virtual machine is provided. The method may comprise creating a planned virtual machine based on a first realized virtual machine or a template (e.g., an OVF file), performing a configuration operation on the planned virtual machine, and converting the planned virtual machine to a second realized virtual machine. The configuration operation may comprise interaction with a virtualization platform managing the planned virtual machine.

In some embodiments, a computer-readable storage medium is provided. The computer-readable storage medium may store instructions that, when executed by a processor, cause the processor to perform a method comprising creating a planned virtual machine. The method may further comprise validating the configuration of the planned virtual machine, in response to first input, and allocating a resource to the planned virtual machine, in response to second input.

In some embodiments, a system for data control is provided. The system may comprise a plurality of physical computing devices including a first physical computing device and a second physical computing device. The system may also comprise a controller configured to create a planned virtual machine on the first physical computing device, coordinate online migration of a realized virtual machine executing on the second physical computing device to the first physical computing device by using the planned virtual machine, and interact differently with the planned virtual machine and the realized virtual machine.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
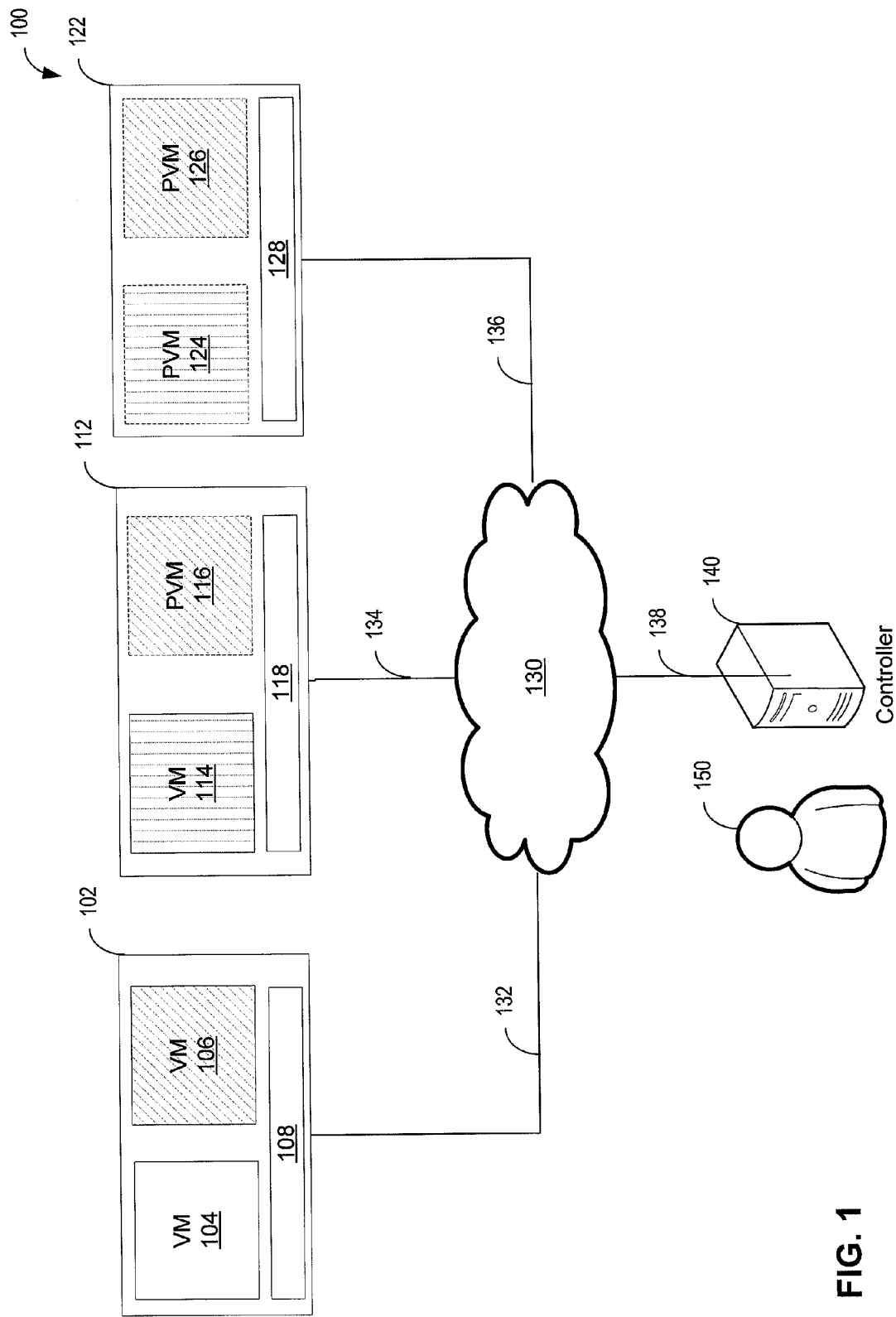
FIG. 1 shows an exemplary system supporting planned virtual machines, in accordance with some embodiments of the present disclosure.

The inventors have recognized and appreciated that greater utility can be derived from computing resources in a computing environment that supports planned virtual machines. A realized virtual machine may be a virtual machine as is known in the art. A realized virtual machine, for example, may be implemented on a virtualization platform. Applications or other software components may be loaded on the realized virtual machine and may execute using resources supplied by the realized virtual machine. The virtualization platform may maintain one or more data structures defining the realized virtual machine, including such information as resources assigned to the realized virtual machine.

A planned virtual machine may be represented with a structure like a realized virtual machine, but in such a way that a virtualization platform interacts differently with a planned virtual machine and a realized virtual machine. In particular, a planned virtual machine is not recognized by a virtualization platform as a realized virtual machine so that the virtualization platform does not attempt to execute any software applications on the planned virtual machine. For example, while a virtualization platform may allocate compute cycles to a realized virtual machine according to its scheduling algorithm, no compute cycles are allocated to a planned virtual machine—unless it is converted to a realized virtual machine.

Nonetheless, a planned virtual machine may be represented with a structure that allows for interaction with the planned virtual machine. The structure may store values of parameters that characterize a realized virtual machine such that a user, the virtualization platform or other components may manipulate these parameters. Further, a virtualization platform may interact with the planned virtual machine, such as by allocating resources to the planned virtual machine, validating the configuration of the planned virtual machine, and/or initializing the planned virtual machine. Further, because the planned virtual machine may have a structure that mirrors an actual virtual machine, the planned virtual machine may be converted simply to a realized virtual machine, using some or all of the same structure.

The inventors have recognized that conventional approaches to migrating virtual machines rely either on the virtualization platform or on a user to control the migration process and have both appreciated the shortcomings of each of these types of approaches and recognized that, in various embodiments, some or all of these shortcomings may be overcome through the use of planned virtual machines.

The inventors have recognized that fully automated techniques that rely on a virtualization platform to control all stages of migrating a virtual machine from a source host to a target host have a high risk of failure because errors may occur during such an operation and the virtualization platform may not be able to recover from these errors. One source of errors may be configuration differences between the source and target hosts and such configuration differences may not be known in advance.

In one example of such an approach to migration, a virtualization platform may create a virtual machine template (e.g., an OVF file) from a realized virtual machine on a source host, pass the template to a target host, and create and start a new realized virtual machine on the target host based on the template. However, due to one or more configuration errors, the target host may not be able to process the received template. In this case, a user has to edit the OVF template and the entire migration process has to start all over again, which is inefficient and time consuming.

On the other hand, manual techniques for controlling migration demand a lot of time and effort from a user. For instance, in the case of a virtual machine move, a user may need to inspect the parameters of the target host, create a new realized virtual machine on the target host, modify the settings of the new realized virtual machine to match the parameters of the target host, move data associated with the existing realized virtual machine to the target virtual machine, and remove the existing realized virtual machine from the source host. Furthermore, it is up to the user to determine how to recover from any errors that may occur during any of the above-described steps.

The inventors have recognized and appreciated that providing a planned virtual machine may overcome some of the above-mentioned shortcomings of conventional techniques for migrating realized virtual machines. However, not every embodiment addresses every one of these drawbacks, and some embodiments may not address any of them. As such, it should be appreciated that the invention is not limited to addressing all or any of the above-discussed drawbacks of these conventional techniques.

A planned virtual machine may be integrated into the process of migrating a realized virtual machine from a source host and may be used to stage a target virtual machine on the target host. Advantageously, a planned virtual machine may allow for a user and/or the virtualization platform to interact with the planned virtual machine during the migration process and may allow the user and/or the virtualization platform to perform a configuration operation on the planned virtual machine.

The planned virtual machine may be represented by a data structure storing parameters of a realized virtual machine, but may present the data structure to a virtualization platform so that it appears different than the same data structure used for a realized virtual machine. In accordance with some embodiments, the data structure may be presented differently using different access privileges to these parameters than a realized virtual machine would. For instance, different access privileges may allow a user to change configuration parameters of a planned virtual machine, but not allow the user to change corresponding configuration parameters of a realized virtual machine.

Allowing a user to interact with a planned virtual machine to perform a configuration operation on the planned virtual machine (e.g., change one or more configuration parameters of the planned virtual machine) may allow configuration errors to be avoided when the planned virtual machine is subsequently converted to a realized virtual machine. This capability may allow for the resolution of any errors arising in the migration process that the virtualization platform could not resolve on its own without user input.

For example, a realized virtual machine may be migrated from a source host to a target host by first creating a planned virtual machine on the target host. A user may interact with the virtualization platform on the target host to perform a configuration operation on the planned virtual machine. This operation may involve resolving errors in configuration parameters of the planned virtual machine, reserving resources for the planned virtual machine on the target host, and/or moving data from the source host to the target host. Afterward, the virtualization platform may complete the migration by converting the planned virtual machine into a realized virtual machine.

The inventors have appreciated that the above-described approach based on planned virtual machines may allow an existing realized virtual machine on a source host to continue executing while the new realized virtual machine is being staged as a planned virtual machine. Accordingly, a virtualization platform may perform a variety of actions associated with the planned virtual machine without affecting the existing realized virtual machine. Examples of such actions include allocating resources for the planned virtual machine on the target system, synchronizing data between the existing realized virtual machine and the planned virtual machine, validating the configuration of the planned virtual machine, initializing the planned virtual machine or canceling the migration at any stage of the migration.

After this configuration is performed, the planned virtual machine may be converted to a realized virtual machine and the source virtual machine may be deactivated such that the target virtual machine replaces the source virtual machine without disruption. Nonetheless, while the configuration is on-going, there is little risk that other components interacting with the source virtual machine will experience an error because of a confusion over which virtual machine, the source or target, should be performing operations. This capability may be particularly desirable, for example, in a cluster computing environment in which computing tasks are allocated to nodes, implemented by virtual machines in which errors might occur if a cluster controller attempts to allocate a task to a target virtual machine in the process of being configured.

At the same time, the user may interact with the planned virtual machine at any stage of the migration. For instance, the user may resolve any issues the virtualization platform is unable to resolve automatically, allocate resources for the planned virtual machine, and control the timing of each stage of the migration.

A user may interact with the planned virtual machine in any of numerous ways. In some embodiments, the user may interact with the planned virtual machine through a virtualization platform interacting with the planned virtual machine. For instance, the user may interact with the planned virtual machine by interacting with the virtualization platform that created the planned virtual machine. That platform may provide tools that allow a user, either directly or indirectly, to specify parameters of a virtual machine. Such tools and other interfaces provided by a virtualization platform are known in the art and may be applied to planned virtual machines.

Planned virtual machines may be used in any suitable computing environment. For instance, planned virtual machines may be used in any computing environment in which realized virtual machines may be used. In particular, planned virtual machines may be used in computing environments that may be configured to support any type of virtual machine, and may be of particular benefit in a platform that supports migration, such as moving, copying, backing up, and importing a realized virtual machine, performed either online (live) or offline.

A computing environment configured to support planned virtual machines may comprise one or more physical computing devices. A physical computing device may be any computing device. In some embodiments, such a computing device will be one or more servers. However, it should be appreciated that the form factor of the computing device is not critical to the invention and the computing device may be or include any other suitable device, such as an embedded computing device, a mobile computing device, a rack-mounted computing device and the like.

In some embodiments, the computing environment may comprise multiple physical computing devices that may be interconnected. The physical computing devices may be interconnected in any suitable way and may be interconnected through any suitable network to form a computer cluster, a computing grid or any of numerous distributing computing systems. One such computing environment that supports planned virtual machines is illustrated in FIG. 1. Though, in other embodiments, the computing environment may comprise a single physical computing device that supports planned virtual machines as planned virtual machines may be used to support operations other than migration between hosts and some migrations (e.g., backup, import, and replication) may be defined with respect to a single host.

FIG. 1 shows an exemplary system 100 comprising servers 102, 112, and 122 that may communicate with one another and with controller 140 via network 130. Though, in this illustrative example, system 100 is shown to contain three servers and one controller, any suitable number of servers and/or controllers may be used, as the number of servers and/or controllers is not a limitation of the present invention. For example, system 100 may be a computer cluster or a distributed computing environment each of which may comprise tens, hundreds, thousands, or tens of thousands of servers.

Network 130 may comprise, for example, the Internet, a LAN, a WAN, and/or any other wired or wireless network, or combination thereof. As shown, servers 102, 112, and 122, and controller 140 may be connected to network 130 via wired connections 132, 134, 136, and 138, respectively. Though, it should be recognized that the servers and the controller may be connected to network 130 using any other means, as embodiments of the invention are not limited in this respect.

A server may host any suitable number of realized virtual machines and any suitable number of planned virtual machines. A server may host zero, one, or more realized virtual machines and zero, one, or more planned virtual machines. The number of realized virtual machines and the number of planned virtual machines hosted on a server or by a set of servers in a system, such as system 100, is not a limitation of the present invention. For instance, in the illustrated example, server 102 is shown to host realized virtual machines 104 and 106, server 112 is shown to host realized virtual machine 114 and planned virtual machine 116, and server 122 is shown to host planned virtual machines 124 and 126. Realized virtual machines and planned virtual machines are discussed in greater detail below with reference to FIG. 2.

Any realized virtual machine hosted by a server in a computing environment, such as the environment of system 100, may be migrated. Migrating a realized virtual machine may comprise copying the realized virtual machine from a host server to one or more target servers, moving the realized virtual machine from a host server to another server, and backing up a realized virtual machine from the host server. Though it should be appreciated, that migration of a realized virtual machine may comprise other operations as are known in the art. For instance, a realized virtual machine may be imported from a backup copy as part of an error recovery process.

It should be noted that, in some instances, a host server may also be the target server, while in other instances a host server may be a different server than the target server. For example, a realized virtual machine may be copied on the same server such that multiple copies of a realized virtual machine may be hosted on the same server.

In some embodiments, a planned virtual machine may be used to help migrate an existing realized virtual machine to a target server in order to create a new realized virtual machine. A planned virtual machine may be used to stage the new realized virtual machine on the target server. A planned virtual machine may be used to stage the new realized virtual machine as part of any suitable type of migration and, for instance, may be used to stage a new realized virtual machine as part of any of the previously-described types of migrations. Though, it should be appreciated that a planned virtual machine may be created for reasons other than as part of a migration of a previously established realized virtual machine.

In the illustrative example of FIG. 1, realized virtual machine 106 may be migrated from host server 102 to target server 112 and/or to target server 122. In this case, planned virtual machine 116 may be used to stage a new realized virtual machine on server 112 and planned virtual machine 126 may be used to stage a new realized virtual machine on server 122. In FIG. 1, this is illustrated by identical shading of realized virtual machine 106 and planned virtual machines 116 and 126.

As another example, realized virtual machine 114 may be migrated from host server 112 to target server 122. In this case, planned virtual machine 124 may be used to stage a target realized virtual machine on server 122, which is indicated by identical shading of realized virtual machine 114 and planned virtual machine 124.

It should be recognized that in a computing environment, such as system 100, not every migration may involve using planned virtual machines. In some cases, every migration may involve using planned virtual machines. In other cases, some, but not all migrations may involve using planned virtual machines. Still in other cases, a computing environment may support planned virtual machines, but may not use planned virtual machines as part of any migrations.

Any realized virtual machines and planned virtual machines hosted on a server may be managed by a virtualization platform. A virtualization platform may manage any suitable number of realized virtual machines and any suitable number of planned virtual machines.

A virtualization platform may be a software layer that may manage realized and planned virtual machines on a server. Though, in some embodiments, a virtualization platform may be implemented in any suitable way, such as by using combination of software and hardware, as the invention is not limited in this respect.

The virtualization platform may execute on the server hosting the realized and planned virtual machines that the virtualization platform may be managing. In the illustrative example of FIG. 1, realized virtual machines 104 and 106 may be managed by virtualization platform 108, realized virtual machine 114 and planned virtual machine 116 may be managed by virtualization platform 118, and planned virtual machines 124 and 126 may be managed by virtualization platform 128. Additionally, the virtualization platform may be controlled from another physical computing device communicatively coupled to the server hosting the realized and planned virtual machines. For instance, virtualization platform 108 may be controlled by controller 140.

A virtualization platform may manage realized and planned virtual machines by interacting with them. A virtualization platform may interact with realized virtual machines differently than it may interact with planned virtual machines. For instance, a virtualization platform may allow for software (e.g., operating system, software applications) to execute on a realized virtual machine, but not on a planned virtual machine.

A virtualization platform may manage planned and realized virtual machines hosted on a server by managing the sharing of resources of the server among the realized and planned virtual machines. A virtualization platform may control the allocation of resources to realized virtual machines and planned virtual machines. A resource may be any of numerous physical resources available on a physical computing device. For instance, a physical resource may be a memory resource, a network resource, or a storage resource. Alternatively, a resource may be a host resource, which is a resource represented to a virtual machine as a physical resource by a virtualization platform. For instance, a host resource may be implemented by executing a software module to simulate, possibly using underlying physical components, a resource such as, for example, an Ethernet or a fibre channel switch. Additionally, the virtualization platform controls when operations of the virtual machine are executed by the processor or processors of the host. Though it should be recognized that a virtualization platform may manage the sharing of any other resources of a physical computing device known in the art and is not limited to managing only the above-mentioned resources.

A virtualization platform may manage access to any realized and planned virtual machines hosted on a server. A virtualization platform may provide different levels of access to realized virtual machines and planned virtual machines. For instance, a virtualization platform may allow values of parameters that characterize a planned virtual machine to be modified, but may not allow values of the corresponding parameters that characterize a realized virtual machine to be modified. Further, though the virtualization platform may allocate resources such as memory or network connections to a planned virtual machine in the same way that it allocates such resources to a realized virtual machine, the platform does not allocate processing time to a planned virtual machine.

A virtualization platform may manage at least a portion of a migration. A virtualization platform may manage a portion of a migration that may be associated with the server on which the virtualization platform may be managing realized and planned virtual machines. For instance, in system 100, virtualization platform 108 may manage at least a portion of any migration involving realized virtual machines 104 and 106, while virtualization platform 118 may manage at least a portion of any migration involving realized virtual machine 114 and planned virtual machine 116.

A migration may involve one or more virtualization platforms. When a migration is associated with one or more servers, virtualization platforms on each of these servers may be involved in the migration and may coordinate their actions. For example, in a migration involving a source host (e.g., server 102) and a target host (e.g., server 112), virtualization platforms 108 and/or 118 may be involved in the migration. Such coordination may occur using techniques as is known in the art or in any other suitable way.

A migration may be controlled in any of numerous ways. For instance, a migration may be controlled by a program executing on a physical computing device, by a user, or by a combination thereof. For example, a migration may be controlled by a user and/or a physical computing device interacting with any virtualization platforms associated with a migration. Controlling a migration may comprise controlling any stage of a migration such as initiating, completing and/or aborting the migration.

In some embodiments, a user may interact with a virtualization platform associated with a migration to control the migration. A user may interact with the virtualization platform by providing input to the virtualization platform. A user may provide input to the virtualization platform directly, such as by entering instructions or parameters through a user interface, or indirectly, such as by taking an action that causes execution of a script or other tool. A user may provide input in response to a prompt associated with the migration process, identify a source of input data or may provide input in any other suitable way, whether or not prompted.

A user may interact with a virtualization platform through any suitable physical computing device. In the example illustrated in FIG. 1, user 150 may interact with any virtualization platform in system 100 through controller 140. Though in some embodiments, user 150 may interact with one or more virtualization platforms associated with a migration directly without controller 140. For instance, user 150 may interact directly with a virtualization platform through the server on which the virtualization platform may be executing. For example, user 150 may interact with virtualization platform 128 through server 122. Still in other embodiments, a user may interact with virtualization platforms associated with a migration operation using any suitable means, as the invention is not limited in this respect.

A user may interact with virtualization platforms associated with a migration by providing input to the virtualization platform to perform actions as part of the migration. In some instances, a user may provide input to control the timing and flow of a migration. For example, a user may indicate when a certain stage of a migration may start. A user may initiate a migration and/or may initiate a stage of the migration. This is described in greater detail with reference to FIG. 3. In some instances, a user may provide input to address an error that may arise during the migration. The input may be used to correct an error or to abort the migration. For instance, a user may provide input to address an error in a configuration parameter associated with the configuration of a planned virtual machine.

In some embodiments, controller 140 may be used to signal any virtualization platforms associated with a migration and may do so in response to user input. Though, in some cases, controller 140 may signal virtualization platforms without user input.

Controller 140 may be used to coordinate a migration from a source host (e.g., server 102) to a target host (e.g., server 112) by signaling virtualization platforms (e.g., 108 and 118, respectively) executing on the source and target hosts. For example, controller 140 may signal a virtualization platform to create a planned virtual machine, to validate the configuration of the planned virtual machine, and/or to allocate resources to the planned virtual machine. Additionally, controller 140 may signal a virtualization platform to synchronize data between a planned virtual machine managed by the platform and an existing realized virtual machine, initialize the planned virtual machine, convert the planned virtual machine to a new realized virtual machine, and/or to delete the existing realized virtual machine.

Figure 2:
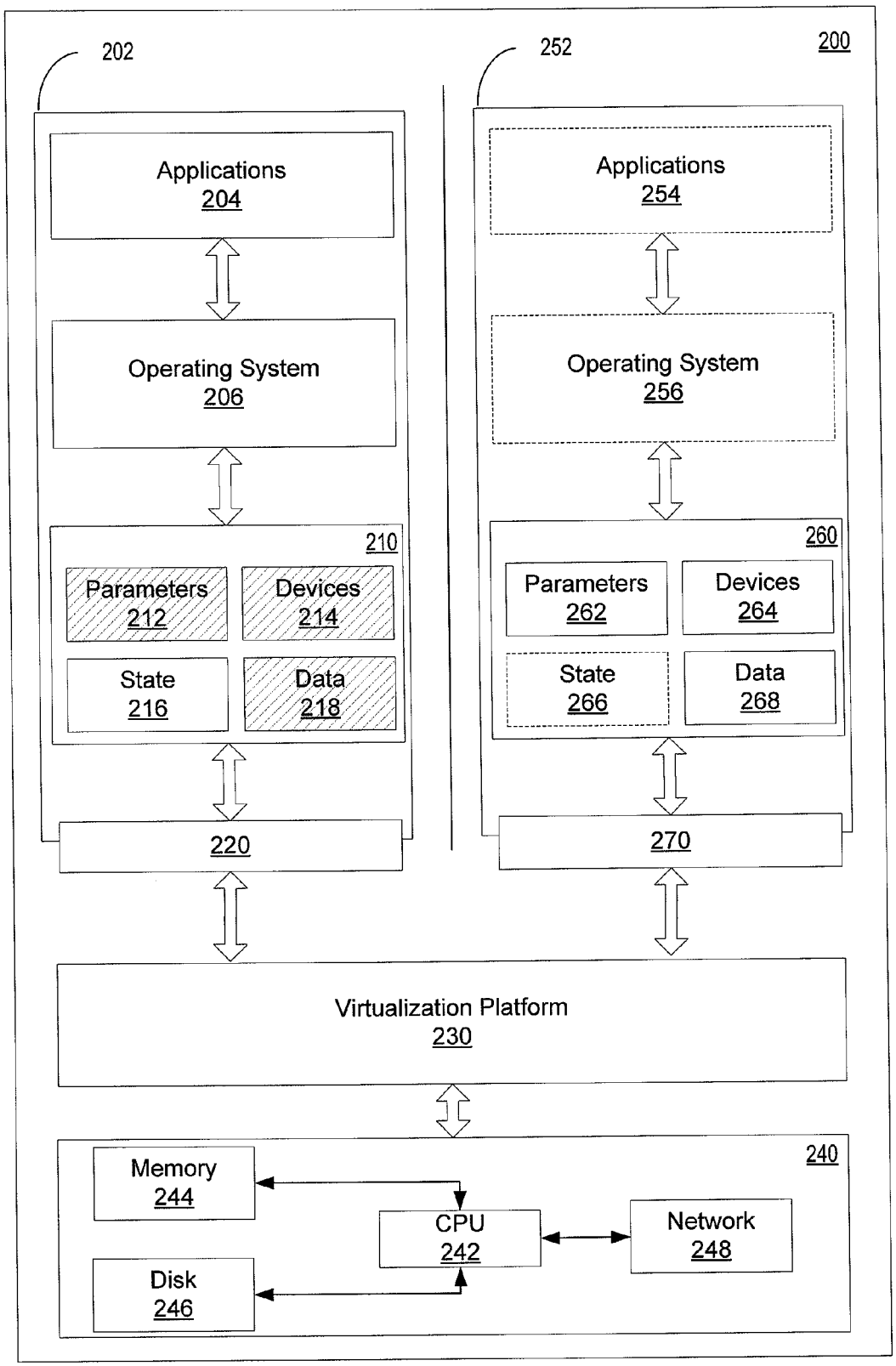
FIG. 2 is a block diagram of components within a physical computing device supporting a realized virtual machine and a planned virtual machine, in accordance with some embodiments of the present disclosure.

Regardless of how a computing environment supporting a planned virtual machine may be configured, such an environment may include a physical computing device (e.g., servers 102, 112, and 122) that may host zero, one or more realized virtual machines and zero, one or more planned virtual machines. FIG. 2 illustrates an architecture of such a computing device.

In particular, FIG. 2 is an illustrative block diagram of hardware and software components within computing device 200, which is shown as hosting realized virtual machine 202 and planned virtual machine 252. Computing device 200 may be any suitable computing device and, for instance, may be server 112 shown in FIG. 1. In this case, realized virtual machine 202 may be realized virtual machine 114 and planned virtual machine 252 may be planned virtual machine 116. Though computing device 200 is shown as hosting one realized virtual machine and one planned virtual machine, this is not a limitation of the present invention as the computing device may host any suitable number of realized and/or planned virtual machines.

Computing device 200 comprises hardware components 240. Hardware components 240 may include any of numerous hardware components of a physical computing device as is known in the art. For example, hardware components 240 may include CPU 242, memory 244, hard disk 246, and network hardware components 248. Though hardware components 240 are not limited by these examples and may include any other hardware components that may be needed to support virtualization.

FIG. 2 also illustrates software components that may execute within computing device 200. In the embodiment illustrated, the software components may be stored as processor-executable instructions and configuration parameters and, for instance, may be stored in memory 244 or a disk 246 associated with CPU 242.

One example of a software component executing within computing device 200 is virtualization platform 230. Virtualization platform may perform any of numerous functions associated with virtual machines. For instance, virtualization platform 230 may manage realized and planned virtual machines (e.g., realized virtual machine 202 and planned virtual machine 252). As another example, virtualization platform 230 may perform any of numerous functions associated with migrating realized virtual machines.

Virtualization platform 230 may manage virtual machines at least in part by managing how virtual machines access and share hardware resources of physical computing device 200. For instance, virtualization platform 230 may manage how virtual machines access memory, disk, processor and/or network resources of computing device 200.

A virtualization platform may manage a virtual machine by communicating with the virtual machine and the hardware components of the host computing device using techniques as are known in the art. For example, as illustrated in FIG. 2, virtualization platform 230 may communicate through communication interfaces of a virtual machine (e.g., communication interfaces 220 and 270 of the realized and planned virtual machines 202 and 252, respectively) and of hardware components 240.

Virtualization platform 230 may perform functions as part of migrating realized virtual machines from/to computing device 200. For instance, virtualization platform may create and manage planned virtual machines as part of a migration, allocate resources to planned virtual machines and allow a user to interact with the planned virtual machine. The role of a virtualization platform during a migration operation is described in more detail below with reference to FIGS. 3a and 3b.

Realized virtual machine 202 may comprise a number of software components in addition to communication interface 220. For instance, realized virtual machine 202 may comprise an operating system 206 which may support execution of applications 204. Operating system 206 may be any suitable operating system and may support any of numerous applications written for the operating system.

A realized virtual machine may use a virtualization platform (e.g., platform 230) and hardware components 240 to execute operating system 206, which, in turn, can manage execution of applications 204. Here, operating system 206 and applications 204 may be implemented using techniques as are known in the art.

A realized virtual machine may also comprise a configuration module 210, which may be implemented as a data structure stored in the memory of physical computing device 200 or in any other suitable location. In the example of FIG. 2, configuration module 210 is illustrated as including parameters 212, virtual devices 214, state parameter 216, and data 218. It should be appreciated that FIG. 2 is a schematic representation of a computing device. Though in FIG. 2 a realized virtual machine is shown as comprising configuration module 210, in some embodiments, configuration module 210 and/or any information contained in configuration module 210 may be managed by the virtualization platform. In this case, the virtualization platform may pass any such information to the realized virtual machine as needed.

Parameters 212 may include any suitable parameters that characterize realized virtual machine 202. For instance, such parameters may include parameters indicating a class type of the virtual machine. In this example, parameters 212 may include a class type parameter indicating that the class type of virtual machine 202 is the class type associated with a realized virtual machine. Parameters may include parameters associated with hardware components 240. For instance, parameters may be associated with disk, memory, network, processor and/or any other suitable hardware components that are available for use by virtual machine 202 or 252. As a specific example, parameters may indicate how the virtual machine may use hardware components (e.g., virtual machine is allowed to use 8 GB of the 16 GB of memory or virtual machine should use a certain network resource), and/or point to data (e.g., virtual machine should write data to a file on a disk such as C:\MyFile.ext). These examples of parameters are merely illustrative and parameters 212 and/or 262 may comprise any of other numerous parameters.

For example, parameters 212 may comprise parameters associated with access privileges. Access privilege parameters may indicate which parameters and functions of the realized virtual machine may be accessed. For instance, access privilege parameters may indicate which parameters and/or functions of the realized virtual machine a user may access and may read and/or write. As another example, access privilege parameters may indicate which parameters and/or functions of the realized virtual machine a virtualization platform may access and may read and/or write. In the illustrative example of FIG. 2, access parameters may be set such that a user may not be able to edit parameters 212, virtual devices 214 and/or data 218. This is indicated with shading of software components 212, 214, and 218.

State parameter 216 may indicate a state of the realized virtual machine. The value of state parameter 216 may correspond to any suitable state of a virtual machine as is known in the art, and, for example, may correspond to a state such as "initialized," "started," and/or "stopped." In some embodiments, state parameter 216 may be changed by virtualization platform 230. Though, in the illustrated example, state information is shown as part of configuration module 210, it should be appreciated that FIG. 2 is a schematic illustration of a computing system, and a computing system may not be implemented with the architecture illustrated. In some embodiments, for example, state information may be tracked by the virtualization platform and provided to the realized virtual machine as necessary.

Virtual devices 214 may comprise any virtual devices that realized virtual machine 202 may use while executing operating system 206 and/or applications 204. For instance, virtual devices 214 may comprise a virtual network device, virtual memory, virtual disk drives, etc. Virtual devices may, through a level of indirection provided by virtualization platform 230, communicate with physical devices of computing device 200. Though virtual devices are shown as part of configuration module 210, in some embodiments, this implementation should be understood to be illustrative rather than limiting. Virtual devices, for example, may be managed by a virtualization platform such as virtualization platform 230.

Data 218 may comprise any data used by realized virtual machine 202 for any suitable purpose. For instance, data 218 may be data accessed by applications 204, operating system 206, and/or any other software module of virtual machine 202. Data 218 may be stored in any suitable way and, for example, may be stored in memory 244 or disk 246 of computing device 200.

As is the case with a realized virtual machine, planned virtual machine 252 may comprise a number of software components in addition to a communication interface. For instance, planned virtual machine 252 may comprise an operating system 256 which may support execution of applications 254. Operating system 256 may be any suitable operating system and may support any of numerous applications written for the operating system. In the illustrated example, operating system 256 may be the same operating system as operating system 206 or may be a different operating system as the invention is not limited in this respect. Similarly, applications 254 may be the same applications as applications 204 or they may be different applications.

A planned virtual machine may comprise software components such as an operating system and applications that are written for the operating system because those components may be loaded and available for execution. However, a planned virtual machine does not execute such software components. For example, planned virtual machine 252 may not execute operating system 256 or any of the applications 254 on computing device 200. In FIG. 2, this is indicated by a dashed line border on software components 254 and 256. Though, it should be recognized that if a planned virtual machine were converted to a realized virtual machine, then the realized virtual machine may execute software components such as operating system 256 and any of applications 254.

A planned virtual machine may also comprise a configuration module 260, which includes parameters 262, virtual devices 264, state parameter 266, and data 268. Though, it should be appreciated that FIG. 2 may be regarded as schematically illustrating information that may be stored and that information need not be stored in a single module as illustrated. In this example, a planned virtual machine is shown as comprising configuration module 260, in some embodiments, configuration module 260 and/or any information contained in configuration module 260 may be managed by the virtualization platform. In this case, the virtualization platform may pass any such information to the planned virtual machine as needed. In this example, configuration module 260 may be implemented as a data structure that has the same format as a data structure used to implement configuration module 210. Parameters 262 may be the same parameters as parameters 212, but may have different values. For instance, parameters 262 may include parameters indicating a class type of the virtual machine. In this example, parameters 262 may include a class type parameter indicating that the class type of virtual machine 252 is the class type associated with a planned virtual machine. Though, it should be recognized that parameters 262 may be different from parameters 212, as the invention is not limited in this respect.

Further, it should be appreciated that any suitable mechanism may be used to differentiate the planned virtual machine and the realized virtual machine. As an example of other ways the differences may be reflected, the interface to the planned virtual machine may be different, may have different access control privileges or may be stored in a different way.

Parameters 262 may characterize planned virtual machine 252 so as to allow for a user to interact with the planned virtual machine. For instance, parameters 262 may include access privilege parameters that may allow a user and/or a virtualization platform to interact with the planned virtual machine. In particular, access privileges may be set such that a user may access some parameters and/or functions of the planned virtual machine and, for example, may be set such that a user can edit parameters 262, virtual devices 214, and/or data 218.

Another way in which a planned virtual machine and a realized virtual machine may be differentiated is through the states supported. For example, a planned virtual machine may not be put in some of the states that a realized virtual machine can support. For instance, a planned virtual machine may not be placed in a started or stopped state. Conversely, a realized virtual machine may not be put in some of the states that a planned virtual machine may support. For instance, a planned virtual machine may be put into an initialized state (while being initialized as described below with reference to FIG. 3b) or a replicating state. Accordingly, state parameter 266 may indicate whether the planned virtual machine is initialized or replicating.

Virtual devices 264 may comprise any virtual devices that planned virtual machine 252 may use while executing operating system 256 and/or applications 254. Virtual devices 264 may comprise any of the virtual devices 214 and may comprise virtual network devices, virtual storage devices, etc. Though virtual devices of a planned virtual machine may be initialized, they may not be used to move application data.

Data 268 may comprise any data used by planned virtual machine 252 for any suitable purpose. For instance, data 268 may be data accessed by applications 254, operating system 256, and/or any other software module of virtual machine 252. Data 268 may be stored in any suitable way and, for example, may be stored in memory 244 or disk 246 of computing device 200.

The structures for representing planned virtual machines as described with respect to FIG. 2, may allow for planned virtual machines to be used during a migration of a realized virtual machine. One such migration process is illustrated in FIGS. 3a and 3b.

Figure 3A:
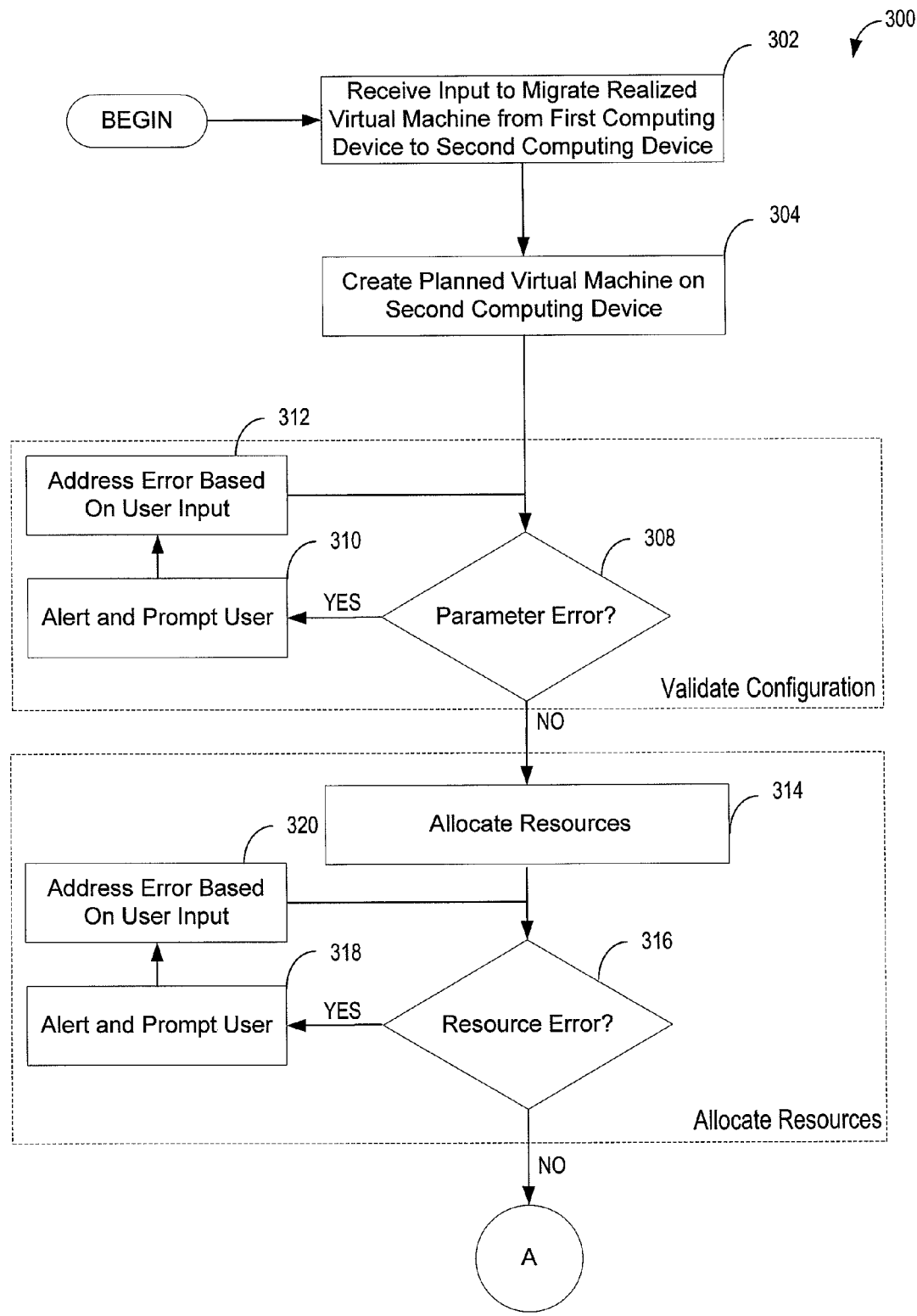
FIGS. 3a and 3b show a flowchart of an illustrative process for virtual machine migration, in accordance with some embodiments of the present disclosure.
Figure 3B:
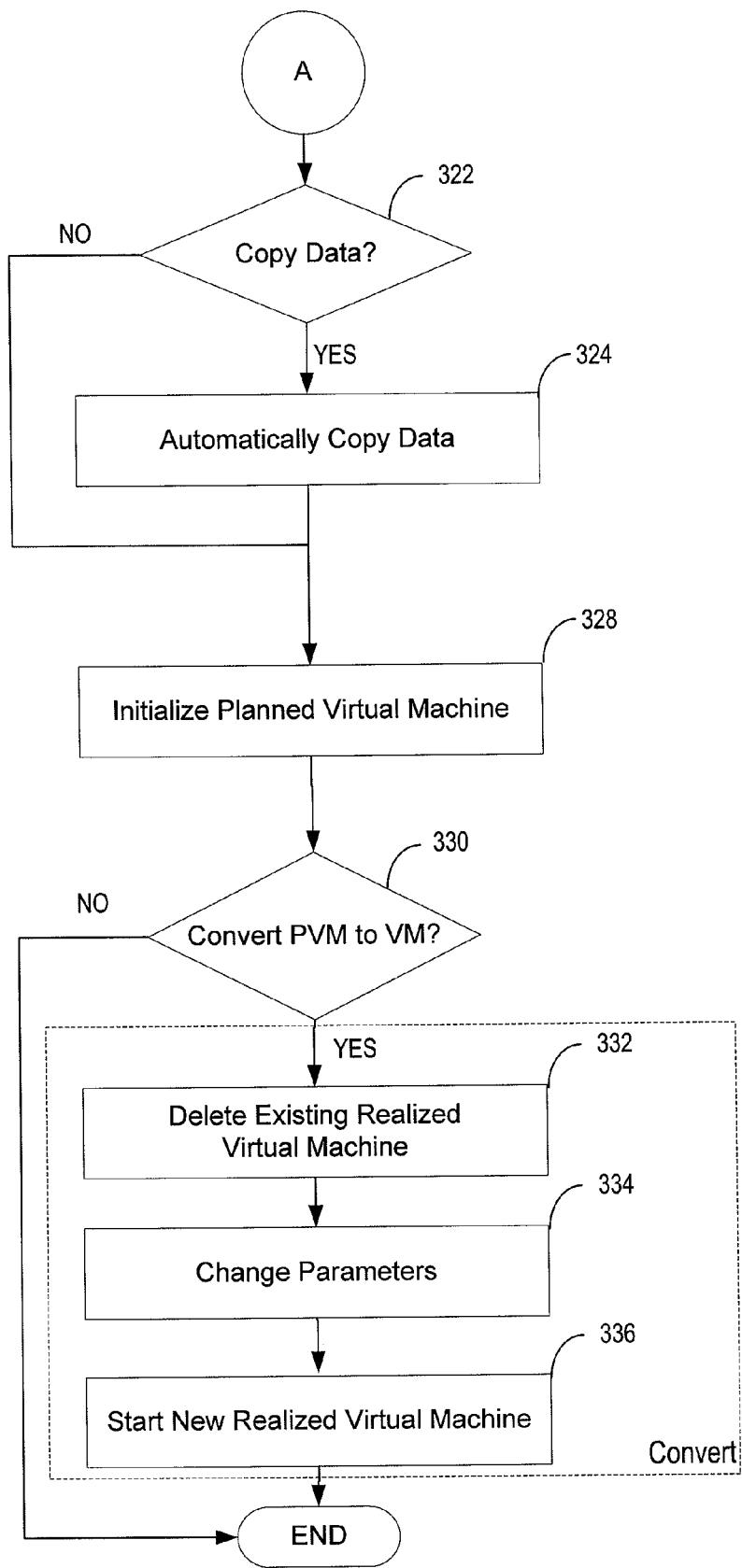

In particular, FIGS. 3a and 3b show a flowchart of an illustrative process 300 for virtual machine migration. Process 300 may be adapted to any suitable type of virtual machine migration including moving a realized virtual machine from a source host to a target host, copying a realized virtual machine from a source host to a target host, backing up a realized virtual machine from a source host, and importing a realized virtual machine to a target host. Accordingly, though process 300 is described below with respect to a migration comprising moving a realized virtual machine from a source host to a target host, this is not a limitation of the present invention as process 300 may be adapted to implement any suitable type of migration.

Process 300 may execute on one or more physical computing devices associated with a migration. In some embodiments, acts of process 300 may execute on the target host of a migration. For example, in the case when a realized virtual machine is moved, copied or imported onto a target host, the target host may execute process 300. As a specific example, server 112 may execute acts of process 300 as part of copying realized virtual machine 106 onto server 112. In some embodiments, some acts of process 300 may execute on the source host of a migration. For example, in the case when a realized virtual machine is moved, copied, or backed up from a source host, the source host may execute process 300. As a specific example, server 102 may execute acts of process 300 as part of copying realized virtual machine 106 onto server 112. In some embodiments, acts of process 300 may execute on a physical computing device controlling a migration, such as controller 140 described with reference to FIG. 1.

Process 300 may begin, in act 302, by receiving input indicating to migrate a realized virtual machine from a first physical computing device (source host) to a second physical computing device (target host). The first physical computing device may be any physical computing device capable of supporting realized virtual machines and may be configured in any suitable way and using any suitable combination of hardware and software components. For instance, the first physical computing device may host a virtualization platform configured to manage one or more realized virtual machines.

For instance, the first physical computing device may be any one of servers 102, 112, and 122, described with reference to FIG. 1 and/or may be configured as server 200 described with reference to FIG. 2. Another example of a first physical computing device is source host 400, illustrated in FIG. 4a.

The second physical computing device may be any physical computing device capable of supporting realized and planned virtual machines and may be configured in any suitable way. The second physical computing device may host a virtualization platform configured to manage one or more realized virtual machines and/or one or more planned virtual machines. For instance, the second physical computing device may be any one of servers 102, 112, and 122, described with reference to FIG. 1 and/or may be configured as server 200 described with reference to FIG. 2. Another example of a second physical computing device is target host 410, illustrated in FIG. 4a.

The first and second physical computing devices may each have any of numerous resources. For example, each device may have network resources, storage resources, and/or memory resources (e.g., as illustrated in FIG. 2). Other examples include processor resources (e.g., a processor or a graphical processing unit) and other resources such as one or more non-uniform memory access (NUMA) nodes. In some instances, the devices may have the same resources, but in other instances the devices may not have the same resources. Indeed, having the same resources (e.g., having the same amount of memory) is not a limitation of the present invention, as virtual machines may be migrated between physical computing devices with different resources. In some instances, in which the devices have the same resource (e.g., each device may have a network connection to the same network), parameters associated with the resource may have different values. For instance, a network resource of the first physical computing device may have a name parameter with value "Network 1," while a network resource of the second physical computing device may have a name parameter with value "Network 2." Alternatively or additionally, a target host may be configured differently than a source host, such that, when a virtual machine is migrated, different parameters are used. Even if, for example, a source and target both have a "Network 1" and a "Network 2," because of requirements of other processes already executing on the target, a virtual machine, once migrated, may be assigned to use "Network 2" even though it was assigned to use "Network 1" on the source host.

Network resources of a device may comprise any of numerous network resources known in the art such as network cards, interfaces and/or devices, their attributes, and any associated software components and configuration parameters for managing these and any other network resources. For instance, source host 400 comprises network configuration parameters including a network name parameter "Name" whose value is "Network1" and a network connection type parameter "Connection" whose value is "Internet." Target host 410 comprises a network name parameter "Name" whose value is "Network2" and a network connection type parameter "Connection" whose value is "Internet."

Storage and memory resources may comprise any of numerous computer-readable storage media such as a hard-drive disks, USB keys, CD-ROM disks, DVD-ROM disks, RAM, and ROM. Computer-readable storage media are discussed in greater detail below. Additionally storage and memory resources may comprise any data stored on computer-readable storage media, any attributes of these media, and any associated software components and configuration parameters for managing these media.

Examples of storage resources of a device include any files indexed by an operating system of a device and any configuration parameters needed to index these files. For instance, source host 400 comprises a parameter "Path" whose value is "C:\MyFile.ext" and data stored in the file such as "ABC . . . " Though, it should be recognized that storage resources are not limited to these examples.

Examples of memory resources of a device include any data stored in a memory of the device and/or any attributes of the memory. For instance, source host 400 comprises a memory attribute "Size" whose value is "8 GB" and data stored in memory including "123 . . . " Though it should be recognized memory resources are not limited to these examples.

In act 302 of process 300, input indicating to migrate a realized virtual machine may be provided automatically by a computer or manually by a user. In the illustrative example shown in FIG. 1, for example, controller 140 may provide an indication to initiate a migration or user 150 may provide an indication to initiate a migration.

Regardless of how the input request is provided, a planned virtual machine may be created on the second computing device in response to the received input, in act 304. The planned virtual machine may be created in any suitable way by any suitable component, such as by a virtualization platform executing on the second computing device or a tool integrated with the virtualization platform. As one example, virtualization platform 118 may create planned virtual machine 116 in response to a request to migrate realized virtual machine 106 from server 102 to server 112.

Creating a planned virtual machine may comprise instantiating a data structure representing the planned virtual machine. The data structure may store parameters whose values may characterize the planned virtual machine. For instance, the data structure may store a class type parameter indicating a class type associated with the planned virtual machine. This may enable a virtualization platform to interact differently with the planned virtual machine than it would with a realized virtual machine.

Figure 4A:
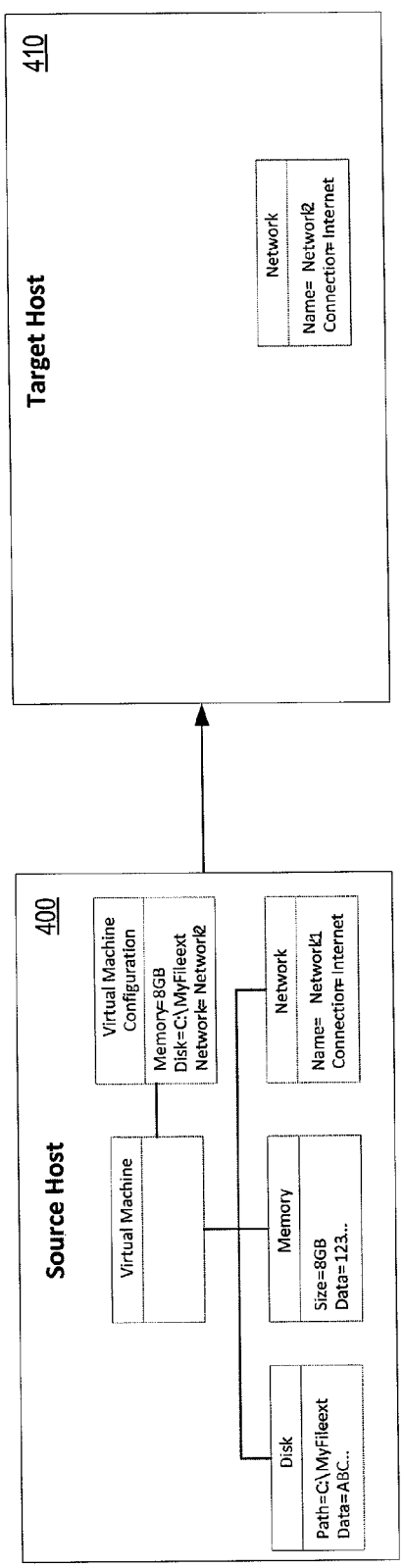
FIGS. 4a-4f illustrate a virtual machine migration example, in accordance with some embodiments of the present disclosure.

As another example, a user may wish to copy the realized virtual machine hosted on source host 400 to target host 410, as shown in FIG. 4a. The realized virtual machine on source host 400 may be configured to use 8 gigabytes (GB) of memory, connect to the file C:\MyFile.ext to store disk contents, and use the network named "Network1" for connectivity to the Internet. To this end, the user may provide input to the virtualization platform executing on host 410 indicating to copy the data structure representing the realized virtual machine from host 400 to host 410. In response to the request, the virtualization platform on host 410 may create a planned virtual machine on host 410 to stage the migration. The virtualization platform on host 410 may create the planned virtual machine by instantiating a data structure representing the planned virtual machine and may assign a class type associated with the planned virtual machine to the data structure.

Creating a planned virtual machine may comprise setting parameters associated with the planned virtual machine. The parameters may be configuration parameters or any other parameters associated with a planned virtual machine. Parameters may be set automatically by the virtualization platform.

In some cases, parameters of the planned virtual machine may be set automatically based on a realized virtual machine. For instance, parameters of the planned virtual machine may be set based on the parameters of the realized virtual machine being migrated. As a specific example, parameters of the planned virtual machine on host 412, shown in FIG. 4b, may be set based on the parameters of the realized virtual machine on source host 400. In particular, the planned virtual machine is configured to use 8 GB of memory and to connect to file C:\MyFile.ext to store data on disk.

Figure 4B:
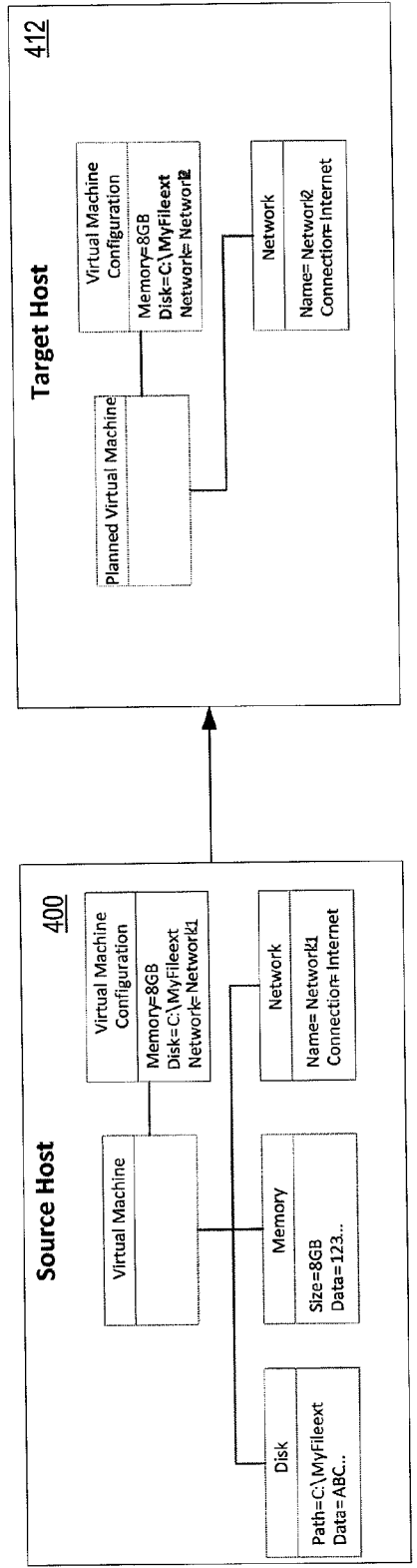

Additionally or alternatively, parameters of the planned virtual machine may be set based on parameters of the second computing device. Parameters of the planned virtual machine may be set based on the realized virtual machine and then modified based on parameters of the second computing device or may be set based on the resources of the second computing device directly. For instance, as shown in FIG. 4b, a network resource of the target host 412 includes a name parameter "Name" whose value is "Network2." Accordingly, the planned virtual machine configuration parameter "Network" is set to value "Network2," rather than "Network1," which is the value of the same parameter in the configuration of the realized virtual machine on host 400. Parameter values may be set automatically, such as by the virtualization platform, or manually, such as in response to user input, or partially automated, such as through the use of a tool that operates in response to user input.

Next, in acts 308-312, the configuration of the planned virtual machine may be validated. Validating the planned virtual machine configuration may comprise determining whether there are any errors in the planned virtual machine parameters and may also comprise addressing the presence of any such errors based on user input.

Accordingly, in act 308, it may be determined whether there are any errors in the planned virtual machine parameters. The presence of parameter errors may be determined in any suitable way and is not a limitation on the present invention. Errors may be detected using techniques as are known in the art. For instance, the presence of parameter errors may be determined based at least in part on the values of parameters of the planned virtual machine. As an example, validation may entail determining whether the parameters of a planned virtual machine indicate usage of resources that are not available on the target host. Parameters may specify unavailable resources because they identify resources that simply are not present, such as by calling for more memory than is installed on the target host or specifying as a network connection that does not exist. Alternatively or additionally, parameters may specify resource usage that is inconsistent with a policy or operating condition on the target host. For example, the target host may limit the amount of memory allocated to each virtual machine and the planned virtual machine may be configured for more memory than allocated. Additionally or alternatively, the presence of a parameter error may be determined based on an error in an action that depends on the parameter. The presence of errors may be determined automatically (e.g., by a virtualization platform on the second computing device) or manually by a user. As a specific example, a virtualization platform on host 412 may determine that there is an error in the parameter "Disk" whose value is "C:\MyFile.ext" because the virtualization platform may not be able to create a file named "C:\MyFile.ext" on the target host or may not be able to locate a file with that name on the target host.

If a parameter error is detected, in act 308, a user may be alerted to the presence of the error, in act 310 of process 300. A user may be alerted to the presence of the error based on output from the virtualization platform on the second computing device. The user may also be prompted to provide input to address the error. The alert and/or prompt may be in any suitable format and may be presented to the user in any suitable way as the format of the alert and/or prompt and the way in which they may be presented to a user is not a limitation of the present invention.

In response to being alerted to the presence of an error in act 310, a user may address the error, in act 312 of process 300. A user may address the error by providing input to the virtualization platform. The input provided by the user may indicate an action for the virtualization platform to take. For instance, the input may indicate for the virtualization platform to abort the migration. Alternatively, the input may indicate how to address the error. For example, the input may provide information that may be used to correct the error and may, for example, provide a value of a parameter that may be used to replace an existing value of the parameter that may be incorrect and/or causing an error.

Figure 4C:
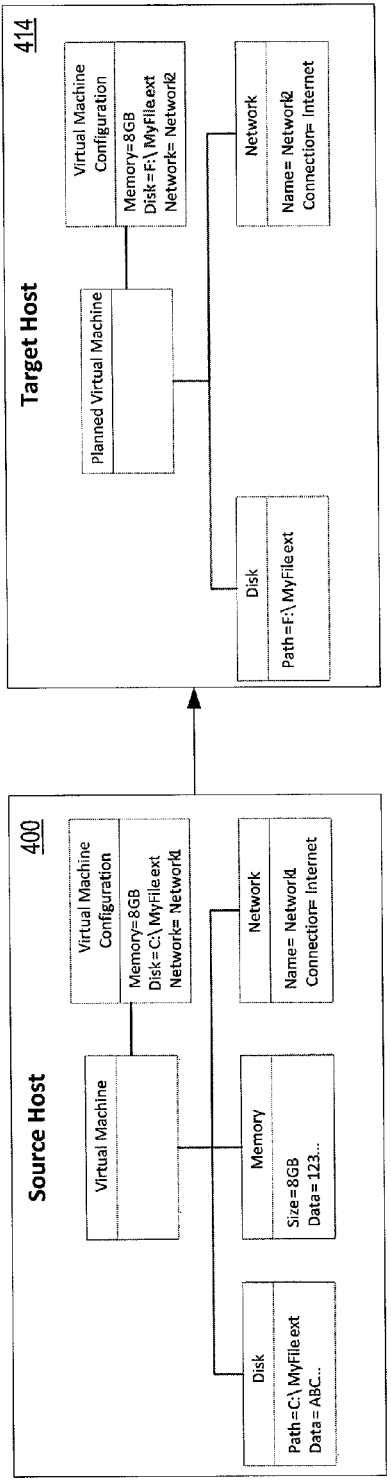

In the above-mentioned scenario, if it is determined that there is an error in the parameter "Disk" whose value is "C:\MyFile.ext" the user may provide input indicating that the value of parameter "Disk" should be set to "F:\MyFile.ext," as shown in FIG. 4c. This may fix a configuration error that results from a difference in configuration of source host 400 and target host 410—the former may have a disk mapped as drive C whereas the latter may have a disk mapped as drive F.

On the other hand, if it is determined in act 308, that there are no parameter errors, process 300 proceeds to acts 314-320 during which resources may be allocated to the planned virtual machine. Though, it should be recognized that in some embodiments, resources may not need to be allocated to the planned virtual machine. Resources may be any suitable resources and may be network, disk, or memory resources. In act 314, resources may be allocated to the planned virtual machine. In some cases, resources may be allocated in response to user input. Resources may be allocated automatically to the planned virtual machine by the virtualization platform. Allocation of resources in this way may mean that the virtualization platform will consider those resources allocated when it considers allocation of resources to other virtual machines. In this way, the resources can be available to the virtual machine when it is converted from the planned virtual machine to a realized virtual machine.

It should be noted that resources may be allocated to a planned virtual machine even though a planned virtual machine may not use the resources allocated to it until it is converted to a realized virtual machine. This is one of the many aspects of planned virtual machines that differentiate them from conventional approaches such as templates compliant with the OVF standard—resources may not be allocated to templates.

Resources may be allocated to the planned virtual machine based on a realized virtual machine For instance, resources may be allocated to the planned virtual machine based on the resources allocated to the realized virtual machine being migrated. As a specific example, resources allocated to the planned virtual machine on host 416, shown in FIG. 4d, may be allocated based on resources allocated to the realized virtual machine on source host 400. For instance, an amount of memory (e.g., 8 GB) may allocated to the planned virtual machine because the same amount of memory is allocated to the realized virtual machine on source host 400.

Additionally or alternatively, resources may be allocated to the planned virtual machine based on resources of the second computing device. For instance, the second computing device may have additional resources that the first computing device source host may not have and these additional resources may be allocated to the planned virtual machine. For example, if the first computing device were to have an amount of memory (or disk space) allocated to a realized virtual machine, a greater amount of memory (or disk space) on the second computing device may be allocated to the planned virtual machine used for migrating the realized virtual machine to the second computing device.

In some embodiments, resources may be sequentially allocated to the planned virtual machine. One type of resource may be allocated to the planned virtual machine before another type of resource is allocated to the planned virtual machine. For instance, network resources may be allocated before disk and memory resources are allocated. Though, the order in which types of resources are allocated may be any suitable order, as the invention is not limited in this respect.

In the case that resources are sequentially allocated to a planned virtual machine in response to user input, user input may be provided between each allocation of a resource (or a type of resource). For instance, user input may be provided to indicate that network resources should be allocated to the planned virtual machine and, subsequently, separate user input may be provided to indicate that disk and/or memory resources should be allocated to the planned virtual machine.

Figure 4D:
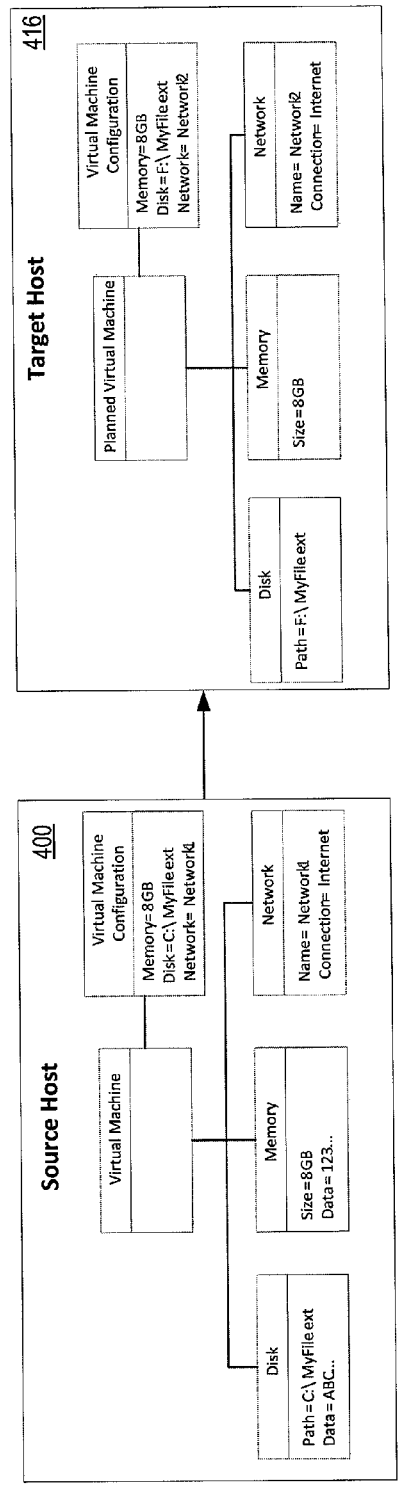

A specific example of sequential resource allocation is illustrated in FIGS. 4b, 4c and 4d. Network resources are allocated to the planned virtual machine in FIG. 4b, next storage resources are allocated to the planned virtual machine in FIG. 4c, and memory resources are allocated to the planned virtual machine in FIG. 4d.

Next, in act 316, it may be determined whether any errors occurred while allocating resources to the planned virtual machine. The presence of resource allocation errors may be determined in any suitable way and is not a limitation on the present invention. For instance, the presence of an allocation error may be determined if a virtualization platform attempts to allocate a resource to the planned virtual machine, but is unsuccessful. For instance, a virtual platform may attempt to allocate 16 GB of memory to a virtual machine (e.g., because 16 GB were allocated to an existing realized virtual machine that is being migrated), but 16 GB of memory may not be available.

If a resource allocation error is detected, in act 316, a user may be alerted to the presence of the error, in act 318 of process 300. As in the case of a parameter error, a user may be alerted to the presence of the error based on output from the virtualization platform on the second computing device and may be prompted to provide input to address the error. The alert and/or prompt may be in any suitable format and may be presented to the user in any suitable way as the format of the alert and/or prompt and the way in which they may be presented to a user is not a limitation of the present invention.

In response to being alerted to the presence of a resource allocation error in act 318, a user may address the error, in act 320. A user may address the error by providing input to the virtualization platform. The input provided by the user may indicate an action for the virtualization platform to take. For instance, the input may indicate to abort the migration. Alternatively, the input may indicate how to address the error. In this case, the input may provide information that may be used to correct the error and, for example, may provide a different resource to allocate to the planned virtual machine. As another example, the input may indicate to allocate a different amount of a resource. In the above-mentioned memory example, a user may indicate to the virtualization platform to allocate a smaller amount of memory (e.g., 8 GB) than the amount of memory the platform attempted to allocate (e.g., 16 GB), which caused the resource allocation error.

On the other hand, if it is determined, in decision block 316, that there are no resource allocation errors, process 300 proceeds to decision block 322 during which it may be determined whether data may be copied during the migration. In decision block 322 it may be determined whether any data from a source host may be copied onto the target host (or from/to a backup source in a case of a backup/import migration). Such a determination, and/or the data copy process, may be performed using techniques as are known in the art for virtual machine migration. For instance, in a case that a realized virtual machine is moved from a source host to a target host, it may be determined that data associated with the realized virtual machine may be copied to the target host.

Data associated with the realized virtual machine may be any of numerous types of data. It may be data accessed by, created by, and/or needed by the planned virtual machine or the virtualization platform managing the planned virtual machine. The data may be associated with a resource of the realized virtual machine. For instance, the data may be associated with a disk or a memory resource of the realized virtual machine.

The determination to copy data may be made in any of numerous ways. For instance, the determination may be made automatically. Alternatively, the determination may be based on user input.

Figures 4E, 4F:
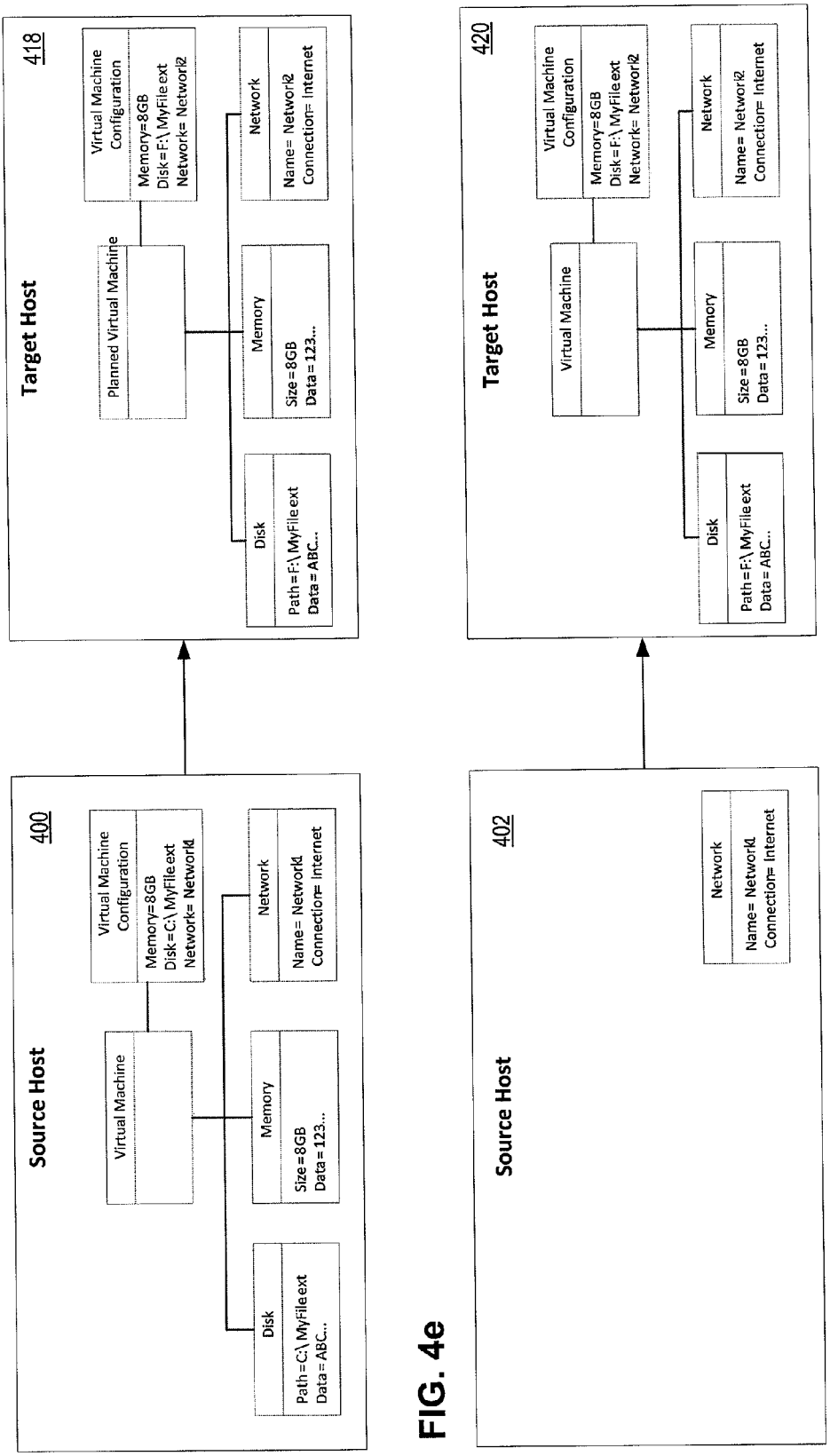

If it is determined, in act 322, that data may be copied then data is automatically copied in act 324, of process 300. Data may be automatically copied by the virtualization platform and may be copied from a source host to the target host. For example, as shown in FIG. 4e, data "ABC . . . " may be copied from a disk of source host 400 (the data copied from file C:\MyFile.ext) to the disk of target host 418 (the data copied to file F:\MyFile.ext). Moreover, in the same example, data "123 . . . " may be copied from the memory of source host 400 to the memory of target host 418.

After data is copied in act 324, or if it is determined in decision block 322 that no data needs to be copied, process 300 proceeds to act 328 during which a planned virtual machine may be initialized. The planned virtual machine may be initialized by the virtualization platform managing the planned virtual machine and, in some instances, may be initialized in response to user input. Though, the planned virtual machine need not be initialized in response to user input as the invention is not limited in this respect. For instance, the planned virtual machine may be initialized as soon as decision block 322 or act 324 completes. It should be recognized that, in some instances, a planned virtual machine may not be initialized. Whether a planned virtual machine is initialized may depend on the type of migration operation for which the planned virtual machine is being used. For example, a planned virtual machine may be initialized during live migration, but may not be initialized during offline migration.

Initialization of a planned virtual machine may comprise any of numerous operations. For instance, it may comprise initializing virtual devices associated with the planned virtual machine, which may also entail configuring physical devices that implement the functions of those virtual devices. For instance, a virtual network card may be initialized by connecting to a physical network device (e.g., a card or a switch). In this case, the virtual network card may open a port on the physical network device, open a connection to a network by using the device and/or perform any other suitable initialization operations. Though, the virtual network card may not transmit any data until the planned virtual machine is converted to a realized virtual machine. Additionally or alternatively, initializing a planned virtual machine may comprise changing parameters of the planned virtual machine and/or changing the configuration parameters of the port to which the virtual network card associated with the planned virtual machine may be connected.

After a planned virtual machine is initialized in act 328 and regardless of the manner in which the planned virtual machine is initialized, process 300 proceeds to act 330 during which it is determined if the planned virtual machine will be converted to a realized virtual machine. The determination may be made based on user input or a virtualization platform and, in both cases, may be made based on any suitable criteria as the invention is not limited in this respect.

If it is determined, in act 330, that the planned virtual machine will not be converted to a realized virtual machine, process 300 completes. Any suitable disposition may be made of the virtual machine upon completion of process 300. For example, the planned virtual machine may be deleted. On the other hand, if it is determined that the planned virtual machine may be converted to a realized virtual machine, the conversion occurs in acts 332-334 of process 300.

The conversion of a planned virtual machine into a new realized virtual machine may be done in conjunction with deleting the existing realized virtual machine (e.g., on the source host) that was being migrated, in act 332. Though, it is not a requirement that the source realized virtual machine be deleted. It might, for example, be converted to a planned virtual machine or made inoperative in other ways. However, in the example described herein in which a migration is performed, the source realized virtual machine is deleted. For instance, if a realized virtual machine was being moved (not copied) from a source host to a target host, the realized virtual machine on the source host may be deleted so that there are not two identical virtual machines executing. Though, it should be recognized that in some types of migrations (e.g., copy and backup) the existing realized virtual machine may not be deleted and may continue executing.

Deleting an existing realized virtual machine may comprise deleting all the data structures and parameters representing the realized virtual machine and adjusting the scheduling of processing on the virtualization platform supporting that realized virtual machine to allocate no further processing to the deleted virtual machine. Additionally, deleting an existing realized virtual machine may comprise deleting any data associated with the realized virtual machine from memory and/or storage resources and may also comprise releasing any resources previously allocated to the realized virtual machine. For example, as shown in FIG. 4f, parameters and data associated with the realized virtual machine on source host 400 have been removed.

As part of converting the planned virtual machine to a new realized virtual machine, values of parameters of the planned virtual machine may be changed in act 334 of process 300. Any of numerous parameter values may be changed to convert the planned virtual machine to a realized virtual machine. For instance, values of parameters associated with access rights may be changed such that access rights to planned virtual machine parameters are changed. In some instances, the resultant access rights are such that parameters of the planned virtual machine may no longer be accessed by a user and/or modified based on user input. Conversely, the access rights may be increased for a cluster controller or other component that may interact with the virtual machine once it is realized, but not when it is a planned virtual machine. As another example, the class type associated with a planned virtual machine may be set to be the class type associated with a realized virtual machine. At this point the virtualization platform may interact with the new realized virtual machine as a realized virtual machine and may no longer recognize or keep track of a planned virtual machine associated with the migration. Though, the above examples are merely illustrative and any other parameters may be changed as necessary.

Regardless of what parameter values are changed and what they may be changed to, the new realized virtual machine may be started in act 336 and the migration process 300 completes. From this point onward, the new realized virtual machine may be managed by the virtualization platform, including interacting with other components of a computer system, as any other realized virtual machine. The new realized virtual machine may execute any suitable applications and, if necessary, may be subject to future migration operations.

It should be recognized that process 300 is merely illustrative and may be modified in any of numerous ways. For example, though specific acts (e.g., act 330) were described as occurring in response to user input, any act in process 300 may have occurred in response to user input or may have been automatically performed by the virtualization platform without any user input. In the case that an act occurs in response to user input, user input may need to be received before process 300 proceeds to a subsequent act or decision block. As another example, in some embodiments, various acts of process 300 may not be performed. For instance, though FIG. 3a shows that allocation of resources (acts 314-320) occurs after the configuration is validated (acts 308-312), in some embodiments, resources may not need to be allocated. Similarly, a planned virtual machine (act 328) may not need to be initialized (e.g., offline migration). In addition, the order in which acts may occur may be modified. For instance, the existing realized virtual machine may be deleted after the new realized virtual machine is started. In fact, some acts of the process may occur in parallel rather than sequentially. For instance, acts 332-336 for converting a planned virtual machine to a realized virtual machine may occur in parallel.

Figure 5:
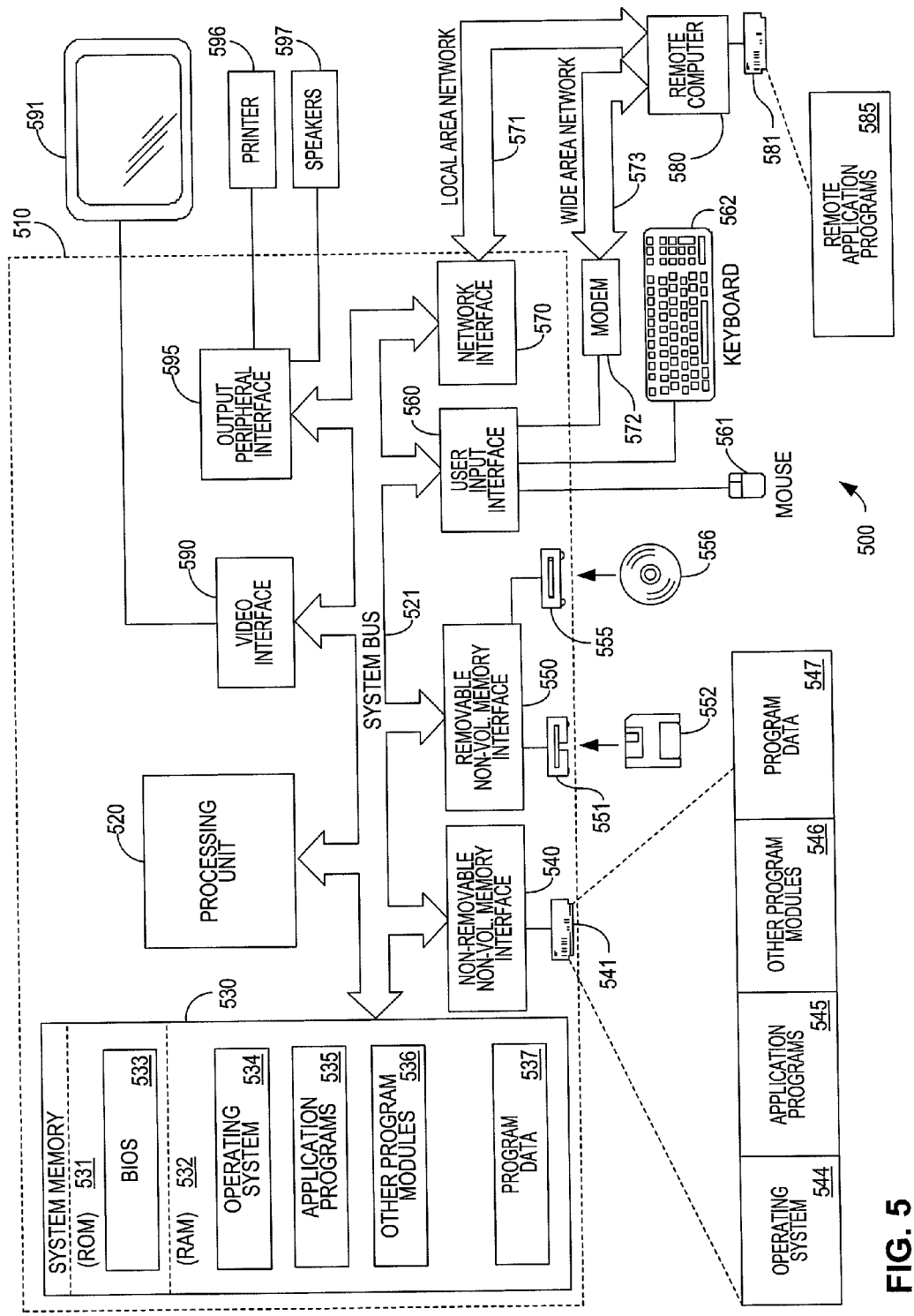
FIG. 5 is a block diagram generally illustrating an example of a computer system that may be used in implementing aspects of the present disclosure.

FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary computing environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for migrating a virtual machine, the method performed by a virtualization platform executing on a host, the virtualization platform managing execution of virtual machines on the host, the method comprising:
   creating a planned virtual machine based on a first realized virtual machine or a template, wherein the virtualization platform enables a user to interact with the virtual machines executing on the host and with the planned virtual machine before the planned virtual machine has been realized into an executing realized virtual machine, wherein the planned virtual machine is managed as a virtual machine object;
   performing a configuration operation on the planned virtual machine, the configuration operation responsive to and corresponding to a user interaction with the virtualization platform managing the planned virtual machine; and
   converting the planned virtual machine to a second realized virtual machine, wherein the configuration operation is performed prior to completion of the converting, and wherein the converting generates the second realized virtual machine based on the configuration operation such that when the second realized virtual machine is executed by the virtualization platform the second realized virtual machine is configured according to the configuration operation, wherein while converting the planned virtual machine resources are allocated to the realized virtual machine according to the planned virtual machine.

2. The method of claim 1, wherein performing the configuration operation comprises:
   detecting a configuration error of the planned virtual machine;
   reporting the configuration error to a user interacting with the virtualization platform; and
   in response to the reporting, receiving input from the user indicating an action to address the configuration error.

3. The method of claim 2, wherein the input from the user indicates that the configuration error should be corrected or that the migration should be aborted.

4. The method of claim 1, wherein:
   the first realized virtual machine is configured to execute on a first physical computing device; and
   the second realized virtual machine is configured to execute on a second physical computing device.

5. The method of claim 4, wherein performing the configuration operation comprises performing, based on user input, at least one of changing a configuration parameter of the planned virtual machine, allocating a resource for the planned virtual machine on the second physical computing device, and/or copying information from the first physical computing device to the second physical computing device.

6. The method of claim 5, wherein changing the configuration parameter comprises:
   changing a parameter associated with a resource on the second physical computing device.

7. The method of claim 5, wherein moving information from the first physical computing device to the second physical computing device comprises moving files and/or memory contents associated with the first realized virtual machine.

8. The method of claim 1, wherein the converting comprises:

deleting the first realized virtual machine.

9. The method of claim 1, wherein the converting comprises:
changing access rights to the planned virtual machine; and
changing a class type associated with the planned virtual machine to a class type associated with the second realized virtual machine.

10. A computer-readable storage medium storing instructions that when executed by a processor, cause the processor to perform a method comprising:
responsive to an operation of live migrating a virtual machine that is executing, creating a planned virtual machine based on the executing virtual machine, wherein the virtual machine continues executing during the live migrating, the planned virtual machine comprising configuration parameters with respective values set from the virtual machine;
while allocating resources to the planned virtual machine, allowing a user to interactively change a value of one of the configuration parameters of the planned virtual machine with first input directed to a virtualization platform managing execution of virtual machines, wherein the virtual machine and the planned virtual machine both have virtual machine operation states managed by the virtualization platform, and wherein the panned virtual machine comprises the allocated resources including at least memory but not cycles of the processor; and
validating, by the virtualization platform, the configuration of the planned virtual machine based on the first input.

11. The computer-readable storage medium of claim 10, wherein:
validating the configuration comprises repairing the invalid configuration based on the first input.

12. The computer-readable storage medium of claim 10, wherein creating the planned virtual machine comprises creating the planned virtual machine in response to input from a user.

13. The computer-readable storage medium of claim 10, wherein the resource comprises a plurality of resources and the allocating comprises:
allocating a first resource in the plurality of resources to the planned virtual machine in response to the second input; and
allocating a second resource in the plurality of resources, after allocating the first resource.

14. The computer-readable storage medium of claim 10, wherein the method further comprises: converting the planned virtual machine to a second realized virtual machine.

15. A system for data control comprising:
a plurality of physical computing devices comprising a first physical computing device and a second physical computing device; and
a controller that performs a process comprising:
creating a planned virtual machine on the second physical computing device and allocating resources of the second physical computing device to the planned virtual machine, and
coordinating online migration of a realized virtual machine executing on the first physical computing device to the second physical computing device by using the planned virtual machine, including converting the planned virtual machine to a second realized virtual machine, the second realized virtual machine comprising resources allocated to the planned virtual machine.

16. The system of claim 15, wherein the controller creates the planned virtual machine by signaling a virtualization platform to create the planned virtual machine on the second physical computing device.

17. The system of claim 15, wherein the controller changes configuration parameters of the planned virtual machine based on input from a user.

18. The system of claim 15, wherein the controller coordinates online migration of the realized virtual machine by signaling a first virtualization platform executing on the first physical computing device and a second virtualization platform executing on the second physical computing device.

19. The system of claim 15, wherein the controller coordinates online migration of the realized virtual machine by signaling the second virtualization platform to validate the configuration of the planned virtual machine.

20. The system of claim 15, wherein the controller is a cluster manager and interacts differently with the planned virtual machine and the realized virtual machine based on a class type associated with the planned virtual machine.

* * * * *